March 6, 1956 A. O. WILLIAMS 2,737,127
RAIL CAR TRUCKS
Filed May 20, 1950 6 Sheets-Sheet 1

INVENTOR.
ALFRED O. WILLIAMS
BY
ATTY.

March 6, 1956 — A. O. WILLIAMS — 2,737,127
RAIL CAR TRUCKS
Filed May 20, 1950 — 6 Sheets-Sheet 2

Fig. 2

INVENTOR.
ALFRED O. WILLIAMS
BY
ATTY.

March 6, 1956     A. O. WILLIAMS     2,737,127
RAIL CAR TRUCKS Filed May 20, 1950

*INVENTOR.*
ALFRED O. WILLIAMS
BY
ATTY.

March 6, 1956 A. O. WILLIAMS 2,737,127
RAIL CAR TRUCKS

Filed May 20, 1950 6 Sheets-Sheet 5

FIG. 6

INVENTOR.
ALFRED O. WILLIAMS
BY
ATTY.

United States Patent Office 2,737,127
Patented Mar. 6, 1956

2,737,127

RAIL CAR TRUCKS

Alfred O. Williams, Battle Creek, Mich., assignor to Clark Equipment Company, Buchanan, Mich., a corporation of Michigan Application May 20, 1950, Serial No. 163,141

6 Claims. (Cl. 105—197)

My present invention relates generally to rail car trucks and is more particularly directed to a rail car truck for use with transportation vehicles of the type now commonly used for surface, elevated, subway, and interurban lines.

A truck of the character to which I make reference is of the powered type having electric motors suitably arranged for driving the truck axles and, in general, comprises a main frame, a subframe, and a bolster, with the subframe being resiliently supported upon the main frame, and the bolster being resiliently supported upon the subframe.

One of the main features of the present invention is to provide a truck of this type in which the principal resilient supports, that is, between the bolster and subframe, are spread as far apart as possible in order to minimize tilting of a car body supported by the bolster caused by vertical oscillations of the wheels of the truck. This spreading of the resilient supports which, in the present invention is of such nature as to provide for support of the bolster outwardly of the side frame members and substantially in line with the outboard wheels of the truck, serves to decrease materially the amplitude of the shocks transferred from the wheels of the truck to the car body.

Another feature of the present invention is the arrangement of the bolster upon the subframe and the subframe upon the main frame to provide a truck which has the desired shock dampening characteristics, and yet one in which the possibility of "nosing" or "hunting" is minimized.

The elongated bolster is restrained against sidewise oscillations, with respect to itself, by resilient means between the sides of the bolster adjacent its overhanging ends and the main frame. Endwise movement of the bolster is limited by soft resilient bumpers carried by the bolster, which are adapted to engage the inner vertical surfaces of the main frame. Vertical movement of the bolster is substantially free and is restricted only by the limitations of the deflection capacity of the spring means interposed between the ends of the subframe and the ends of the bolster, which are in overhanging relationship outwardly of the outboard sides of the main frame. Thus, movement of the bolster is controlled in three dimensions, in three varying degrees of freedom.

It is another feature of my invention to provide a truck wherein the main side frame members are held in parallel relationship by connection, adjacent one pair of diagonal corners, to the axle housings of the driving axles, thus forming a relatively rigid rectangular frame with suitable resilient means being interposed at the other pair of diagonal corners of the main side frame members for mounting of the driving axles so as to accommodate track irregularities.

Still another feature of my present invention is the provision of a main frame which may be easily and economically assembled, and one which will permit the axles of the truck to be easily removed from the ends of the main frame for repairs or replacements.

The truck has lengthwise extending main side frame members which are disposed at opposite sides of the truck parallel to each other, and each frame member comprises an upper and lower channel member spaced apart by gusset plates having two sections that are detachably secured together by means of a plurality of bolts. Detachably mounted by bolts to one pair of diagonal ends of the pair of main side frame members are conventional axle housings, and mounted to the other pair of diagonal ends are pillow blocks of known form. The axle housings and pillow blocks provide support for a pair of transversely extending axles which may be removed from the main frames by suitably supporting the latter, as with jacks, demounting the axle housings and pillow blocks, and sliding the axles away from the main frame.

It is still another feature of my invention to provide a free floating subframe, unrestrained against lateral and lengthwise movement, for absorbing the inertia forces created by the driving motors which are carried by the subframe.

This feature is accomplished by placing the ends of the subframe between the upper and lower channel members, and disposing resilient means between the subframe and the adjacent lower channel members, and between the subframe and the adjacent upper channel members. The subframe is thus resiliently supported above and below, but remains substantially free to float in a horizontal plane.

Still another feature of my invention is the mounting of a third rail collector shoe to one end of the subframe, whereby shocks, caused by the wheel engaging the rail joints, are absorbed by the resilient mounting means of the subframe, thereby eliminating the transmission of rail joint shocks to the collector shoe and support.

Another feature of the present design is the provision of a rail car truck construction, of this general nature, which is readily adapted to receive various accessories, such as propeller shaft, brakes, and a magnetic track brake which may be readily spring suspended from the truck frame without interference with the desired operation of the truck.

Another feature of the present truck design is that it can be standardized for use with wheels of varying diameter, within permissible ranges, without requiring modification of the structural elements of the truck.

Now, in order to acquaint those skilled in the art with the manner of constructing and using the device of my present invention, I shall describe in connection with the accompanying drawings a preferred embodiment of my invention.

In the drawings:

Fig. 7 is a vertical sectional view taken along the line

7—7 in Figure 6, looking in the direction indicated by the arrows; and

Figures 1, 8:
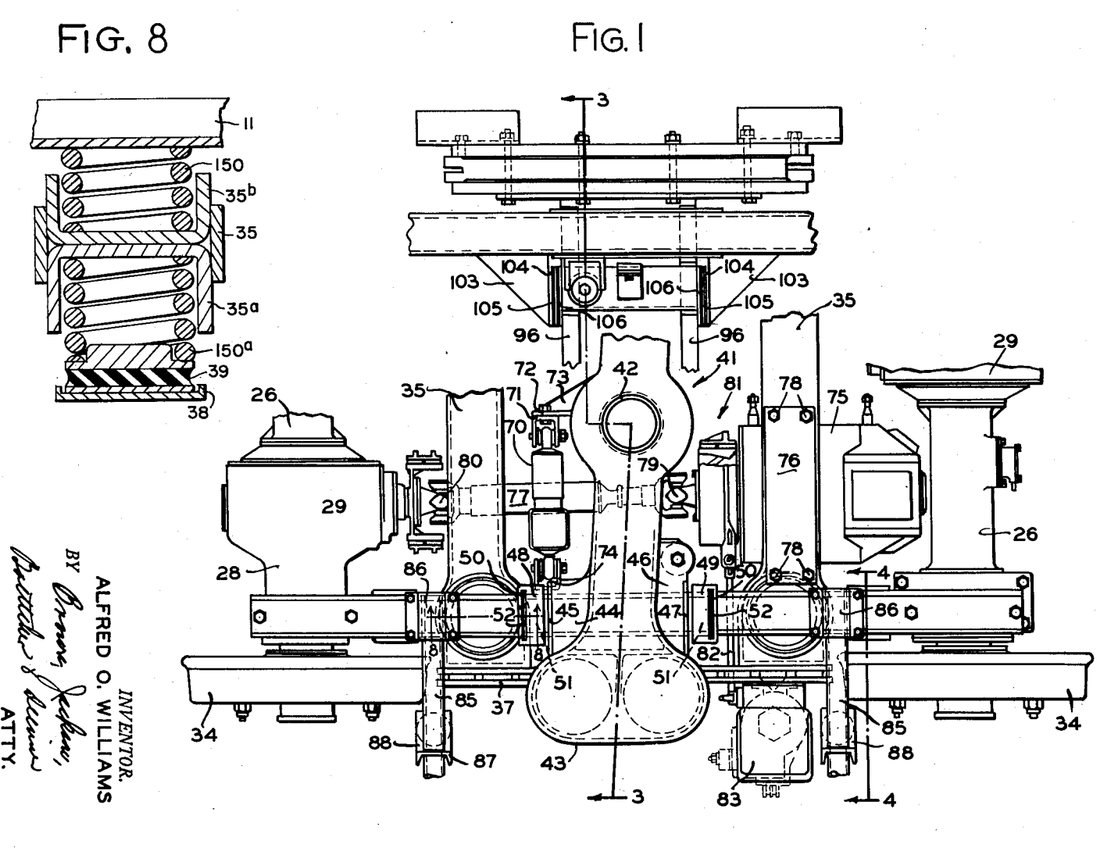
Figure 1 is a plan view, partly broken away, of a rail car truck constructed in accordance with my invention.
Figure 8 is an enlarged partial sectional view taken along the line 8—8 in Figure 1, looking in the direction indicated by the arrows.
Figure 2:
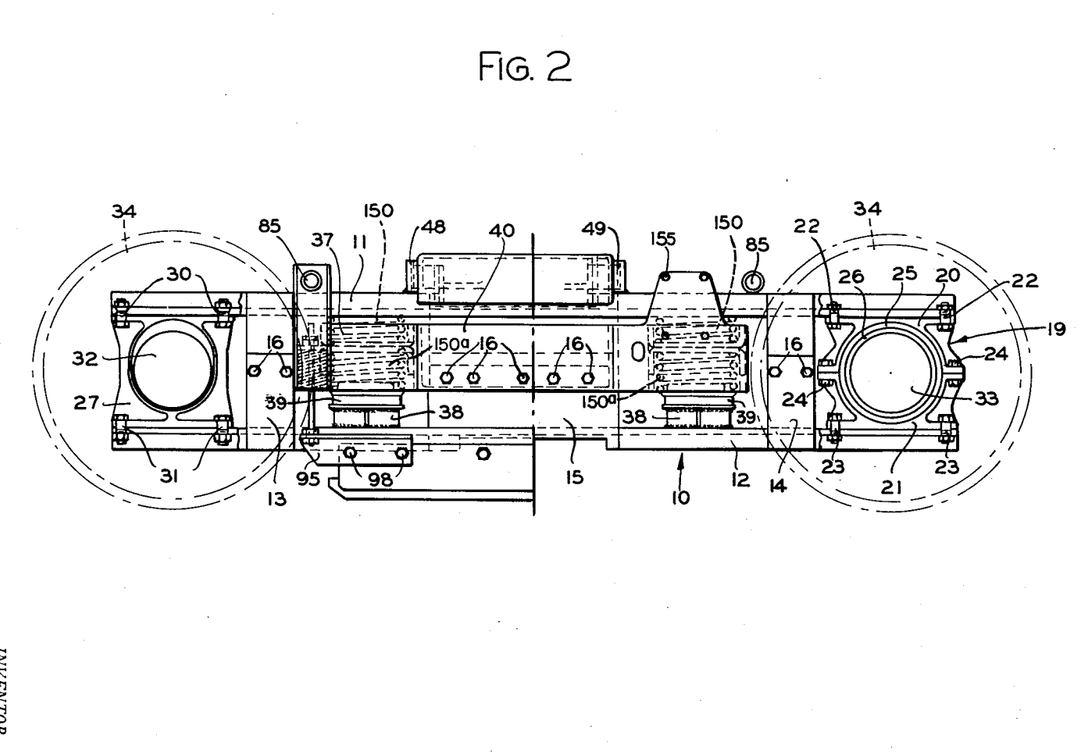
Figure 2 is a side elevational view of the rail car truck of Figure 1.
Figure 3:
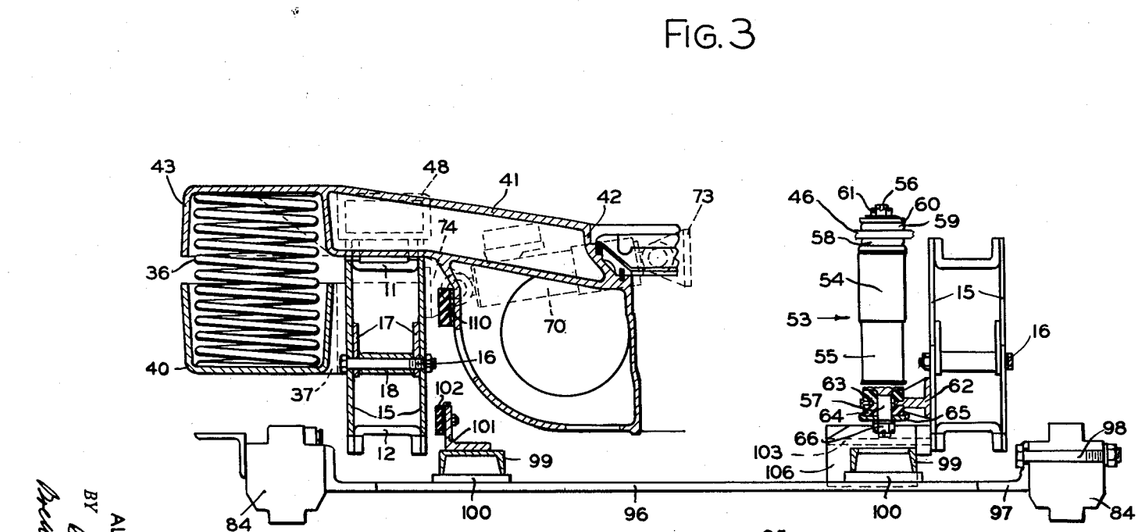
Figure 3 is a transverse sectional view taken substantially along the line 3—3 of Figure 1, looking in the direction indicated by the arrows.
Figure 4:
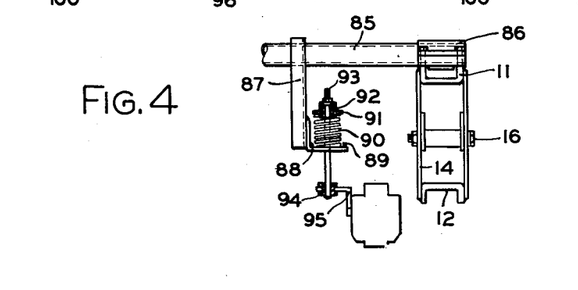
Figure 4 is a sectional view taken along the line 4—4 of Figure 1, looking in the direction indicated by the arrows.

Referring now to Figures 1, 2, and 3, the rail car truck shown comprises a pair of lengthwise extending main side frame members 10 which are disposed at opposite sides of the truck, parallel to each other. Since the main side frame members 10 are of similar construction, it is believed that a showing and description of one will be sufficient for the present disclosure. Each main side frame member 10 is of a box-like construction, comprising upper and lower spaced apart parallel lengthwise extending U-shaped channel members 11 and 12. The outboard legs and the inboard legs of the U-shaped channel members 11 and 12 are secured together by a plurality of pairs of spaced apart vertical gusset plates, of which three pairs are shown embodied in the present frame construction at 13—13, 14—14, and 15—15. Each of the gusset plates 13—13, 14—14, and 15—15 comprise two sections arranged coextensively. The gusset plates are suitably secured, as by welding, adjacent their upper and lower edges, respectively, to the leg portions of the U-shaped channel members 11 and 12. Lengthwise extending plates, one pair of which are shown at 17—17 in Figure 3, are welded along their upper edges to the inwardly facing surfaces of the intermediate portions of each of the upper sections of the gusset plates 13—13, 14—14, and 15—15. The upper and lower sections of the respective gusset plates are detachably secured together by bolts 16 which are disposed through openings formed in the lower sections of each pair of gusset plates, the rectangular plates welded to each of the upper sections of the gussets, and spacer sleeve members 18. The sleeve members 18, adjacent their ends, are suitably secured, as by welding, to the associated surfaces of each pair of the rectangular plates 17—17. From the above description of the main side frame members 10, it will be seen that they are formed into two parts which may be easily assembled and secured together by means of the bolts 16. The central edge portions of the legs of the upper and lower U-shaped channel members 11 and 12 are cut away, as are the adjacent upper and lower edge portions of the gusset plates 15—15, for a purpose to be hereinafter described.

Adjacent one end of the U-shaped channel members 11 and 12, between the bight portions thereof, is secured a pillow block, indicated generally at 19, comprising an upper and a lower portion 20 and 21, respectively. The upper portion 20 is mounted to the outer surface of the bight portion of the U-shaped channel member 11 by means of bolts 22, while the lower portion 21 is mounted to the outer surface of the bight portion of the U-shaped channel member 12 by means of bolts 23. The upper and lower portions are secured together by means of bolts 24. Disposed within the pillow block 19 is an annular resilient ring 25 in which one end 26 of a long axle arm of a gear housing 29 is adapted to be resiliently mounted.

Adjacent the other end of the U-shaped channel members 11 and 12, between the bight portions thereof, is secured a rigid axle housing 27 for the tubular stub axle arm 28 of a gear housing 29 at the other end of the frame of the truck. The axle housing 27 is mounted to the bight portions of the U-shaped channel members 11 and 12 by means of bolts 30 and 31, respectively.

The pair of main side frame members 10 are of the same construction, and are disposed on opposite sides of the rail car truck in opposing relation. That is, a pair of pillow blocks 19 are mounted in one pair of diagonal corners of the main frame, while a pair of rigid axle housings 27 are mounted in the other pair of diagonal corners. Thus, the long axle arms 26 of the gear housings are resiliently mounted adjacent one pair of diagonal corners of the rail car truck, while the stub axle arms 28 of the gear housings 29 are rigidly mounted adjacent the other pair of diagonal corners. By utilizing a construction of the character noted the axles are maintained at right angles to the main side frame members, thereby improving the riding qualities of the truck. The axle arms 26 and tubular stub extensions 28 provide support for a pair of axles 32 and 33 which have suitably secured to their ends flanged wheels 34.

It will be observed that by providing a main frame of the character described, the pillow blocks 19 and the axle housings 27, together with the associated axles, may be easily removed merely by removing the bolts securing the pillow blocks 19 and axle housings 27 to the main frame 10, supporting the frame in a suitable manner, and sliding the axles away from the ends of the main frame.

Welded to the outer surface of the bight portion of the lower U-shaped channel members 12, inwardly of the gussets 13 and 14, are a pair of supporting blocks 38 which provide for the support of resilient sandwich members 39. The rail car truck, of the type to which my present invention relates, is provided with a rectangular subframe, comprising a pair of transversely extending spaced apart frame members 35 which are secured together adjacent their ends by means of cross frame members 37 as shown in detail in Figure 8, the ends of the frame members 35 are formed with suitable basket-shaped portions 35b and inverted basket-shaped portions 35a, into which coil springs 150 and 150a project, respectively. The springs 150a rest upon the resilient sandwich members 39. The subframe is thus resiliently supported above and below for reducing vertical movement of the same relative to the main frame. Although the subframe is resiliently supported for absorbing vertical movements, it is unrestrained against lateral and lengthwise movement and, thus, is adapted to absorb the inertia forces created by the driving motors which, as will be described later in detail, are carried by the subframe.

Formed integrally with the cross frame member 37, as shown in Figures 1 and 2, intermediate of the ends thereof, is an upright basket-shaped spring receiving member 40 which is disposed laterally outwardly of the main frame 10. It will be understood that the opposite end of the subframe is the same as above described.

Extending transversely and slightly diagonally of the rail car truck and located intermediate of the ends thereof is a bolster, shown generally at 41. Inverted basket-shaped spring receiving end portions are formed on the enlarged ends of the bolster 41, and are supported on coil springs 36 carried by the spring receiving members 40. The springs 36 are located outwardly of the main side frame members and substantially in line with the outboard wheels of the truck, and thus serve to materially decrease the amplitude of tilting of the body or bolster caused by vertical oscillations of the wheels of the truck. The coil springs 36 permit substantially free vertical movement of the bolster 41, which is restricted only by the limitations of the deflection capacity of the springs 36. Located centrally of the ends of the bolster 41 is a king pin seat 42 for receiving the king pin of a car body. Formed integrally with one vertical side of the bolster 41, intermediate of the king pin seat 42 and spring receiving members 43, are laterally extending flnages 44 having end vertical flanges 45 formed integrally therewith. Fabricated adjacent the opposite vertical side of the bolster 41 are laterally extending flanges 46 having integral vertical flanges 47. The purpose of the several flanges last referred to will be described hereinafter.

The previously referred to cut-away portions of the legs of the upper U-shaped channel member 11 and the adjacent portions of the gusset plates 15—15 provide clearance between the lower edges of the flanges 45 and 47 and the channel member 11.

Suitably secured, as by welding, to the ends of the legs of the upper U-shaped channel members 11, adjacent the flanges 45, are rectangular cup-shaped members 48, the open ends of which face the flanges 45. Rectangular cup-shaped members 49 are suitably secured, as by welding, to the ends of the legs of the upper U-shaped channel member 11 adjacent the flanges 47 and the open ends of members 49 face flanges 47. The members 48 and 49 each have an elongated slot 50 formed in the upper walls thereof adjacent the closed ends thereof. Disposed within the cavities of the members 48 and 49 are resilient block members 51 which, at their outer ends, are adapted to engage the adjacent flanges 45 and 47. Positioned through each of the elongated slots 50 adjacent the other end of each of the resilient block members 51 are a plurality of shims 52 which are adapted to place the resilient block members 51 under compression. The aforedescribed construction provides for the restraining of the sidewise oscillations of the bolster 41 lengthwise of the truck. As best shown in Figure 3, soft resilient bumpers 110 are mounted to each end of the bolster 41, inboard of the main side frame members 10. The bumpers 110 are adapted to engage the inner central gusset plates 15 of the adjacent main side frame members 10, for limiting or confining endwise movement of the bolster 41 transversely of the truck.

From the foregoing description, it will be observed that movement of the bolster 41 is controlled in three dimensions in three varying degrees of freedom. The bolster 41 is substantially restrained against sidewise movement, limited or confined against endwise movement, and substantially unrestrained against vertical movement. This construction not only provides a truck having desirable shock dampening characteristics, but also one in which the possibility of "nosing" is minimized.

To absorb sudden vertical reactions of the bolster 41 vertical shock absorbers, of which one is shown at 53 in Figure 3, are mounted adjacent opposite sides of the bolster 41 inboard of the main side frame members 10. Since the pair of shock absorbers 53 are mounted in a like manner, it is believed that detailed showing and description of the mounting of one will be sufficient for purposes of the present disclosure. The shock absorber 53 is of conventional construction and comprises an upper tubular portion 54 and a lower tubular portion 55 having bolts 56 and 57, respectively, projecting axially from the closed ends thereof. An annular resilient washer 58 is disposed about the bolt 56 in juxtaposition of the closed end of the tubular portion 54. An opening is formed in the bolster flange 46 through which the threaded end of of the bolt 56 extends. An annular resilient washer 59, like washer 58, is disposed about the bolt 56 in juxtaposition of the upper surface of the flange 46. A metallic washer 60 is placed about the bolt 56 on top of the resilient washer 59 and a nut 61 is threaded onto the end of the bolt 56 so as to hold the above described parts in assembled relation, thereby forming a resilient mount for the upper portion 54 of the shock absorber 53.

The mounting means for the lower end of the shock absorbers 53 comprises a T-shaped bracket member 62, secured, as by welding, to the inboard central gusset plate 15 adjacent the lower portion thereof. The stem portion of the bracket 62 extends laterally inwardly of the rail car truck. An annular resilient washer 63 is disposed about the bolt 57 in juxtaposition of the closed end of the tubular portion 55. An opening is formed in the stem portion of the bracket 62 through which the threaded end of the bolt 57 extends. An annular resilient washer 64, like washer 63, is disposed about the bolt 56 in juxtaposition of the lower surface of the stem portion of the bracket 62. A metallic washer 65 is placed about the bolt 57 and a nut 66 is threaded onto the end of the bolt 57 so as to hold washers 63, 64, and 65 in assembled position, thereby forming a resilient mount for the lower portion 55 of the shock absorber 53. Thus, sudden relative vertical movement between the bolster 41 and the main side frame members 10 is cushioned.

In order to cushion primarily lateral reaction a further shock absorber, indicated at 70, is provided. The shock absorber 70 is pivotally secured adjacent one end to the legs of a U-shaped bracket member 71 which is fixedly secured, as by a bolt 72, to a flange member 73 formed integrally with and projecting laterally from the bolster 41 adjacent the central portion thereof. The shock absorber 70 is pivotally secured adjacent its other end to the legs of a U-shaped bracket member 74 suitably secured to the inboard central gusset plate 15 of the main side frame 10 in a horizontal plane disposed below a horizontal plane passing through the U-shaped bracket member 71. By varying the vertical distance between the ends of the shock absorber 70 a multiplicity of cushioning characteristics may be obtained.

A pair of electric motors 75 are provided and are placed in lateral and longitudinal offset positions and face in opposite directions in the conventional manner in rail car trucks of the type to which my present invention relates. The electric motors 75 and the manner in which they are connected for driving axles 32 and 33 is conventional and it is believed that a general showing and description of one of them is sufficient for purposes of the present disclosure. The electric motor 75 is disposed within the cradle portion of one of the transverse frame members 35 adjacent one end thereof and is confined, in a fixed position, within the cradle of the transverse frame member 35 by means of a cap member 76 which extends lengthwies of the transverse frame 35 and is secured thereto, adjacent its ends, by a plurality of bolts 78. The other transverse frame member 35 is provided with an opening through which the drive shaft 77 of motor 75 is adapted to extend.

The drive shaft 77 is connected at its one end by a universal joint 79 to the armature shaft of the electric motor 75 and at its other end by a universal joint 80 to the shaft extending into the bevel gear housing 29. The shaft extending into the housing 29 carries a pinion which is adapted to have meshing engagement with the bevel gears in the gear housing 29. The bevel gear is fixed to the axle 32 of the truck for driving the same.

The motor 75 is preferably provided with a motor shaft brake, indicated generally at 81, and an actuating rod 82 which extends laterally of the truck beneath the lower U-shaped channel member 12 of the main side frame member 10, to provide braking action for slowing down the truck. The rod 82 is suitably connected in a known manner to a brake actuating mechanism, indicated generally at 83, secured to the subframe member 37. The rod 82 is adapted to effect actuation of the shaft brake 81 in a known manner.

The truck further includes magnetic brakes 84 which extend lengthwise of the truck and are disposed laterally outwardly of the main side frame member 10. To provide support for the magnetic brakes 84, a pair of parallel spaced apart tube members 85 are disposed so as to project laterally outwardly of the main side frame members 10 and are mounted to the upper portions of the channel members 11 by means of cap members 86 bolted thereto. Welded adjacent the outward ends of each of the tube members 85 is the upper end of a downwardly extending C-shaped channel member 87. Suitably secured, as by welding, adjacent the lower portion of each of the channel members 87 is an L-shaped bracket 88, the horizontal leg of which extends laterally inwardly toward the main side frame member 10. The brackets 88 are provided with annular flange portions 89 which act as retainers for the lower ends of coil springs 90. At their upper ends the springs 90 support annular cap members 91 provided with rubber bushings 92 through which pins 93 extend vertically. The pins 93 are resiliently supported both by the springs 90 and the rubber bushings 92 for vertical oscillation relative to the brackets 88. The lower ends of the pins 93 are resiliently connected by means of rubber bushings 94 with the laterally outwardly projecting legs of the flanges 95 which are bolted, as at 98, or otherwise suitably secured, to the brakes 84.

Upon energization of the brakes 84 they are adapted to be urged downwardly and such downward movement of the brakes 84 compresses the springs 90. Upon de-energization of the brakes 84, the springs 90 return the brakes to their normal non-braking positions. The brakes 84 at opposite sides of the truck are interconnected by a pair of transversely extending strap members 96 which are secured at their opposite ends, as by welding, to angle flange members 97 which extend lengthwise of the brakes 84 and are secured thereto along the inner surfaces thereof as by the end bolts 98. The strap members 96 at their opposite ends are interconnected by a pair of C-shaped channel braces 99 which are suitably secured as by welding thereto laterally inwardly of the main side frame members 10. Depending on the diameter of the wheels to be used with the truck of my present invention, one or more spacer members 100 of various thicknesses may be disposed between the channel members 99 and the strap members 96, thereby providing an adjustment for the vertical distance between the brakes 84 and the adjacent rails.

The channel braces 99 have secured intermediate of their ends angle flanges 101 which have mounted to their vertical legs resilient bumpers 102 adapted to engage the inboard central gusset plates 15 of the main side frame members 10 to cushion movement of the brake construction transversely of the truck. As shown in Figure 1, bracket members 103 are mounted to the lower U-shaped channel members 12 of the main side frame members 10, adjacent the ends of the channel members 99. Riveted to the faces of the vertical flange portions 104 of the bracket members 103 are wear plates 105 which are adapted to engage the faces of vertical flanges 106 suitably secured, as by welding, to the ends of the channel members 99 for limiting lateral movement of the straps 96 lengthwise of the main side frame members 10.

The lengthwise intermediate portions of the legs of the lower U-shaped channel members 12 are cut away, as are the adjacent portions of the gusset plates 15—15, as previously mentioned, to permit adequate vertical movement of the brake construction with respect to the main side frame members 10. Openings are formed in the bight portions of the channel members 99 so as to permit the lower mounting bolts 57 of the shock absorbers 53 to pass therethrough during extreme vertical movements of the brake construction, with respect to the frame members 10.

Figure 5:
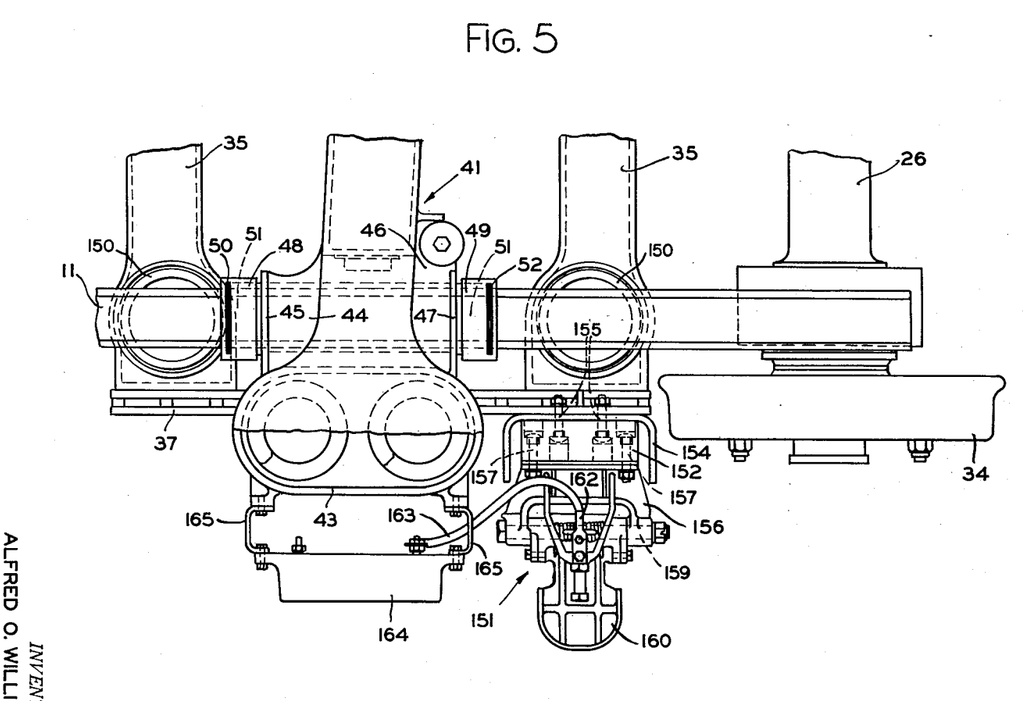
Figure 5 is a partial plan view of the rail car truck of my present invention showing particularly the third rail collector shoe mounted to the subframe of the truck.
Figure 6:
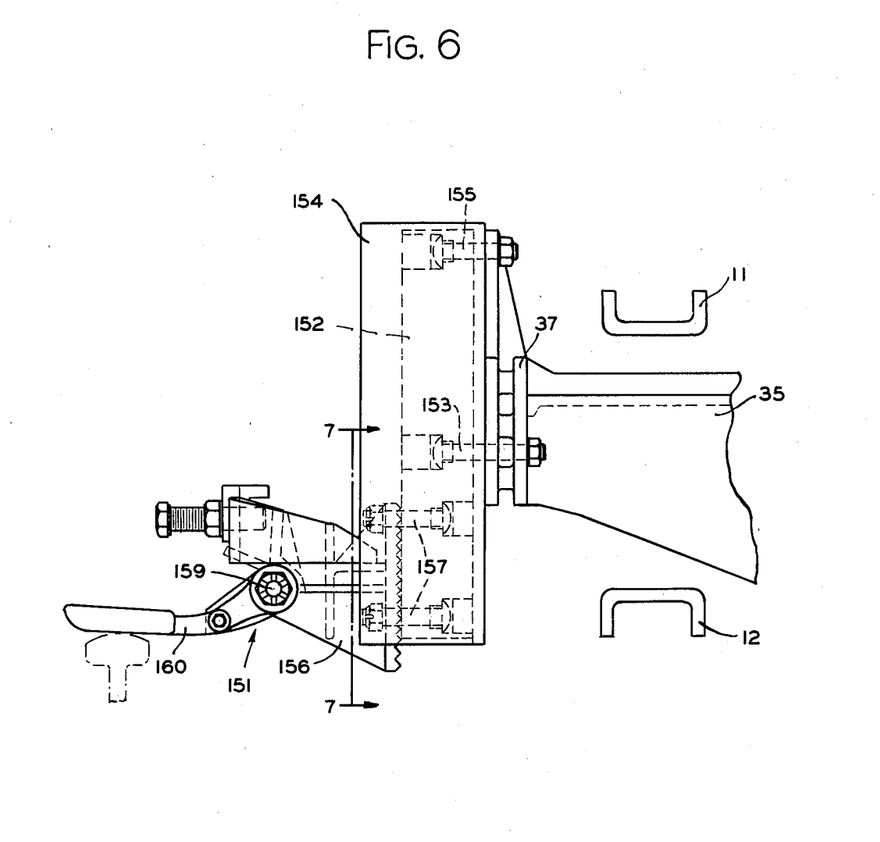
Figure 6 is a side elevational view of the third rail collector shoe shown in Figure 5.
Figure 7:
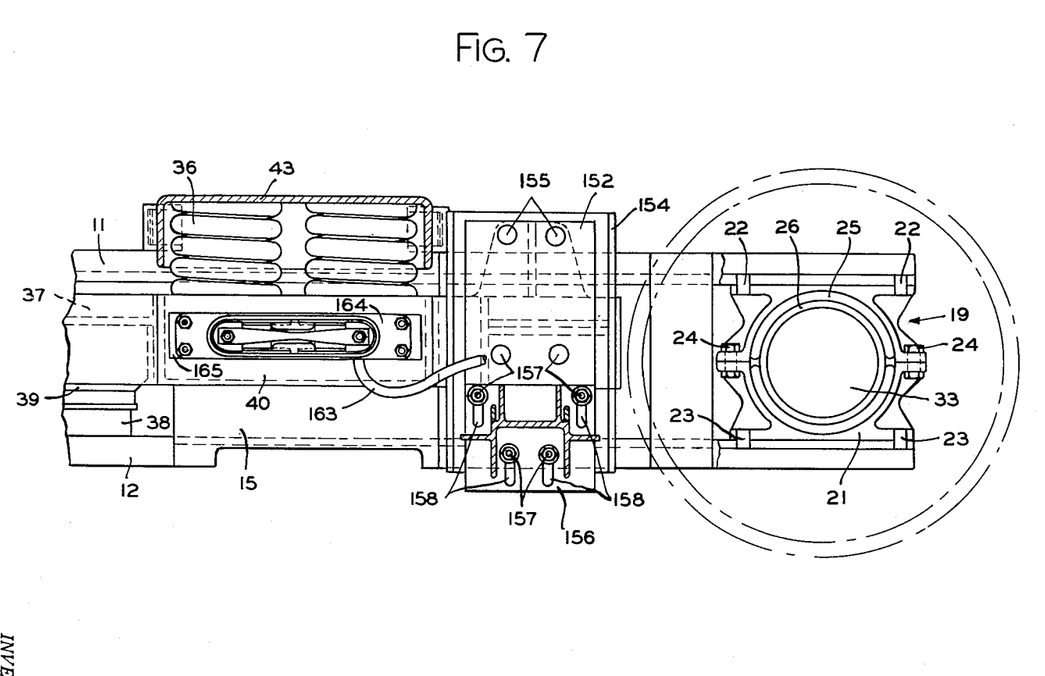

Referring now to Figures 5, 6, and 7, there is indicated generally by the reference numeral 151 a third rail collector shoe construction which, when required, is adapted to be mounted in place of the brake actuating mechanism 83, shown in Figure 1. The third rail collector shoe construction 151 comprises a block member 152, preferably formed of a hard wood, which is suitably secured to the end member 37 of the subframe, as by bolts 153. Interposed between the block member 152 and end member 37 is a substantially U-shaped insulator 154 with the legs thereof extending vertically and laterally outwardly from the truck frame. The insulator 154 is additionally secured to the block member 152 at the upper end thereof by means of bolts 155.

Disposed adjacent the outer face of the block member 152 adjacent the lower portion thereof is a U-shaped frame member 156, with the legs thereof extending vertically and laterally outwardly from the truck frame. The frame member 156 is adjustably mounted to block member 152 by means of a plurality of bolts 157 which extend through vertically extending slots 158 formed in the rear vertical wall of the frame member 156. It will thus be seen that the frame member 156 may be positioned and secured in any one of a plurality of vertical positions for accommodating the third rail collector shoe construction 151 to third rails of various heights.

Pivotally mounted about a horizontal shaft 159, extending between the outer ends of the legs of the frame member 156 is a third rail collector shoe 160. The outer end of the collector shoe 160 is formed with a substantially flat portion which is adapted for engagement with a third rail. The collector shoe 160 is normally biased downwardly by means of a conventional torsion spring 161 disposed concentrically about the shaft 159. The collector shoe 160 has electrical connection with a lug 162 which is part of a power cable 163 leading to a fuse block, indicated generally by the reference numeral 164, mounted by means of brackets 165 to the end of the basket-shaped spring receiving member 40 of the subframe. The fuse block 164 is electrically connected through suitable control means to the motors 75 of the rail car truck.

From the foregoing description of the mounting of the third rail collector shoe construction 151 to the subframe, it will be realized that shocks, caused by the collector shoe engaging the rail joints, are absorbed by the resilient mounting means of the subframe, thereby eliminating the transmission of rail joint shocks to the car body.

While I have shown and described what I consider to be the preferred embodiment of my invention, it will be understood that various modifications and rearrangements may be made therein without departing from the spirit and scope of my invention.

I claim:

1. A rail truck including a rectangular main frame comprising transverse axle housings having wheels at the ends thereof and longitudinal side frame members, a transverse rectangular subframe supported above and below at its corners on said side frame members closely adjacent the wheels and having outboard end extensions beyond said side frame members, a transverse bolster of a length whereby the ends thereof overhang said end extensions, and resilient means in said extensions supporting the ends of said bolster.

2. A rail car truck including longitudinally extending main side frame members each comprising vertically spaced apart upper and lower portions, transverse axle housings mounted adjacent the ends of said main side frame members, a transverse rectangular subframe disposed between the upper and lower portions of said main side frame members, resilient means for supporting said subframe on the lower portions of said main side frame members intermediate of the ends thereof, resilient means between said subframe and the upper portion of said main side frame members intermediate of the ends thereof, a transversely extending bolster overlying the upper portions of said main side frame members, the ends of said subframe and bolster extending outwardly beyond said main side frame members and resilient means for supporting the ends of said bolster on the ends of said subframe.

3. The truck of claim 2 including means between said side frame members and the sides of said bolster for restraining sidewise oscillations of said bolster.

4. The truck of claim 2 including means between said side frame members and the ends of said bolster for limiting endwise movement of said bolster.

5. The truck of claim 2 including means between said side frame members and the sides of said bolster for restraining sidewise oscillations of said boltser, and means between said side frame members and the ends of said bolster for limiting endwise movement of said bolster.

6. In a rail truck, a main frame including parallel side frame members joined at their ends by transverse axles, a rectangularly shaped subframe extending transversely of said main frame, means resiliently supporting said subframe on the intermediate portions of said side frame members, a transversely extending bolster, first means between said side frame members and the ends of said bolster for limiting endwise movement of said bolster, second means between said side frame members and the sides of said bolster for restraining sidewise oscillations of said bolster to a lesser degree than said first means, and third resilient means for supporting the ends of said bolster on the ends of said subframe and for restraining the latter in a vertical direction to a lesser degree than said second means.

References Cited in the file of this patent

UNITED STATES PATENTS

| | | |
|---|---|---|
| 1,620,425 | Batchelder | Mar. 8, 1927 |
| 1,697,513 | Priebe | Jan. 1, 1929 |
| 1,697,514 | Priebe | Jan. 1, 1929 |
| 2,026,015 | Beckette | Dec. 31, 1935 |
| 2,150,630 | Piron | Mar. 14, 1939 |
| 2,184,102 | Piron | Dec. 19, 1939 |
| 2,241,418 | Nystrom et al. | May 13, 1941 |
| 2,242,190 | Blomberg et al. | May 13, 1941 |
| 2,289,423 | Guernsey | July 14, 1942 |
| 2,296,769 | Cox | Sept. 22, 1942 |
| 2,316,046 | Buckwalter | Apr. 6, 1943 |
| 2,321,845 | Nystrom et al. | June 15, 1943 |
| 2,336,661 | Williams | Dec. 14, 1943 |
| 2,347,500 | Parke | Apr. 25, 1944 |
| 2,394,547 | Hickman | Feb. 12, 1946 |
| 2,402,501 | Ledwinka | June 18, 1946 |
| 2,410,011 | Burrows et al. | Oct. 29, 1946 |
| 2,461,382 | Hunter | Feb. 8, 1949 |
| 2,516,082 | Spencer | July 18, 1950 |
| 2,519,169 | Beamer et al. | Aug. 15, 1950 |

FOREIGN PATENTS

| | | |
|---|---|---|
| 630,294 | Great Britain | Oct. 10, 1949 |